Aug. 12, 1930.                G. C. CHASE                 1,773,025
           CARRIAGE SHIFT CONTROL FOR CALCULATING MACHINES
                        Filed Oct. 3, 1927         7 Sheets-Sheet 1.

INVENTOR
Geo C Chase
BY E. W. Anderson

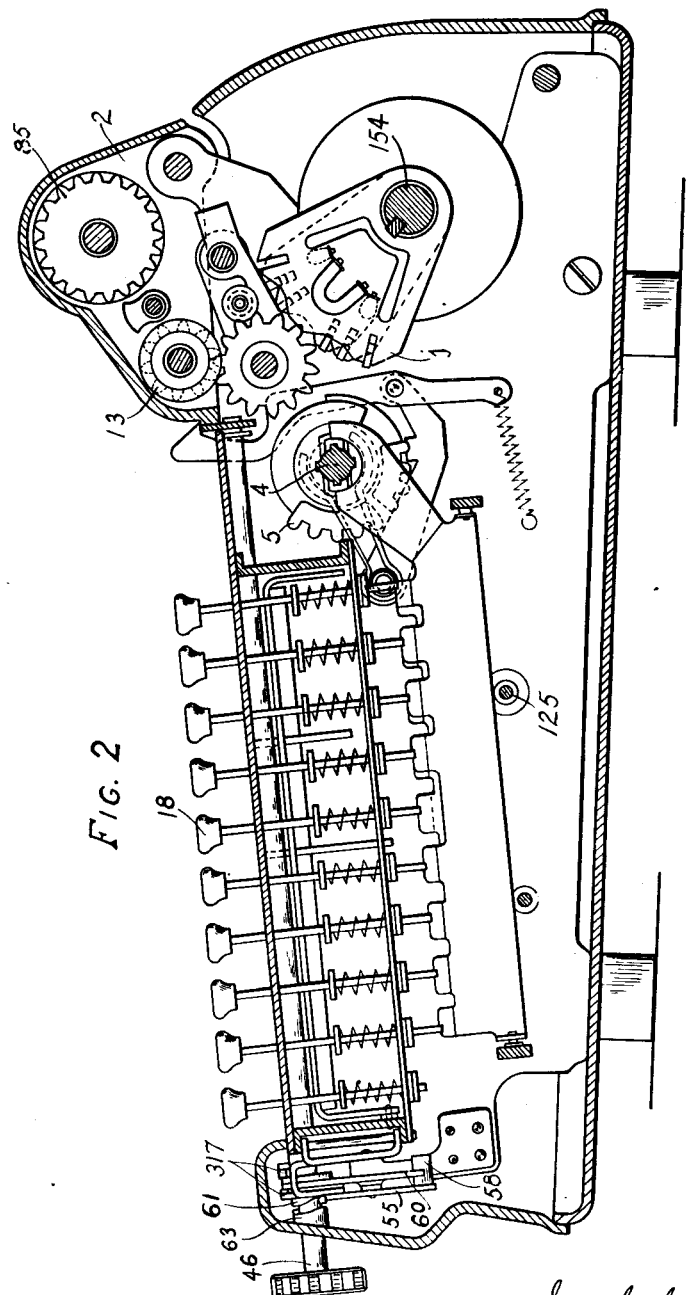

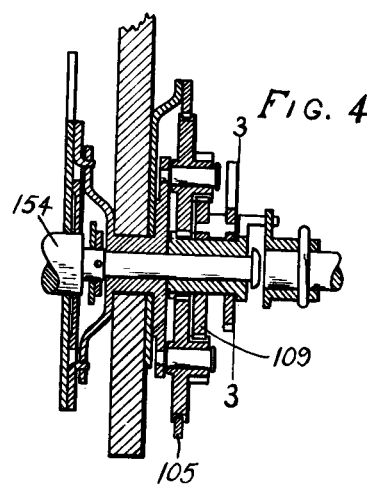
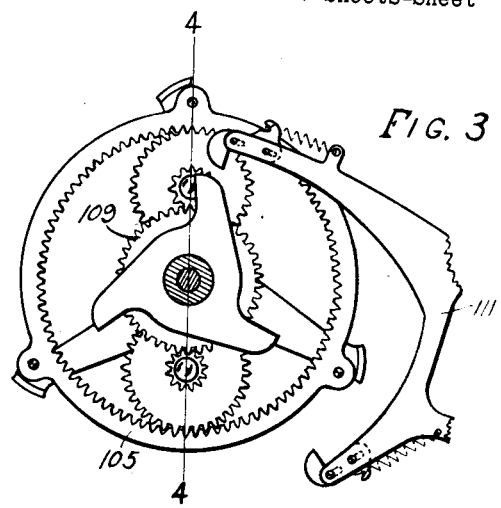
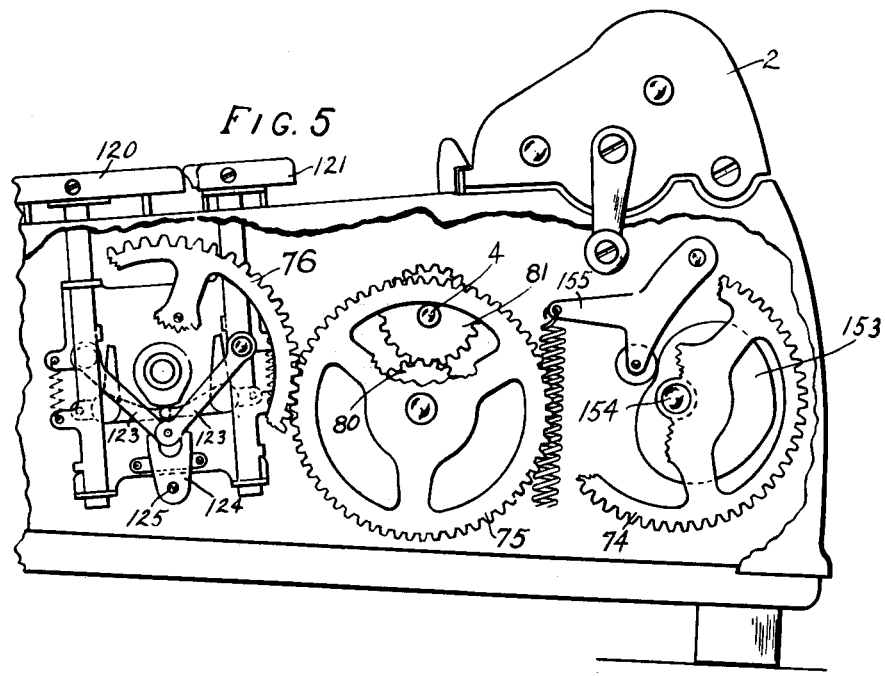

Aug. 12, 1930.     G. C. CHASE     1,773,025
CARRIAGE SHIFT CONTROL FOR CALCULATING MACHINES
Filed Oct. 3, 1927     7 Sheets-Sheet 4
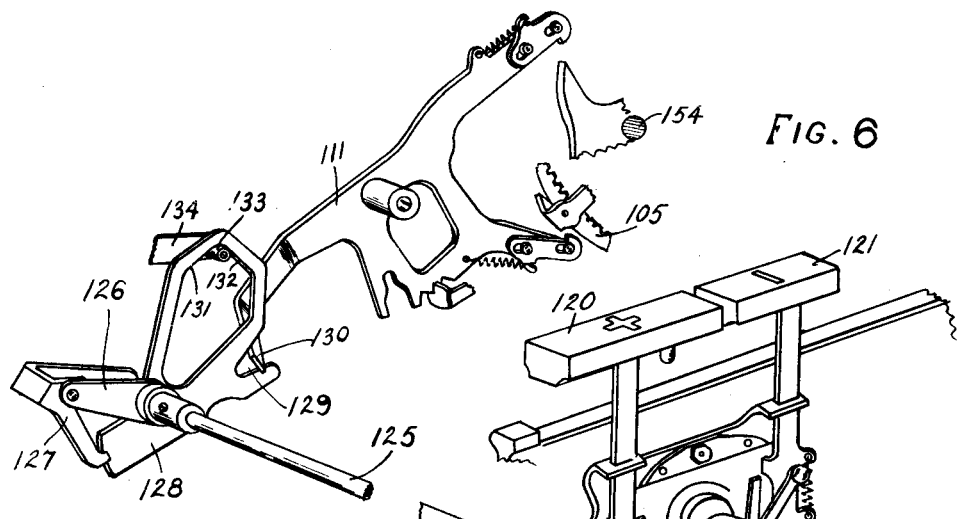
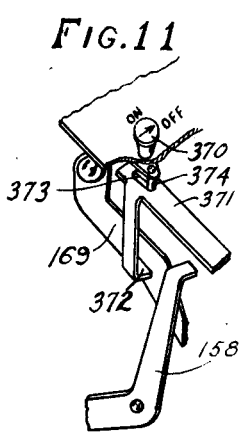
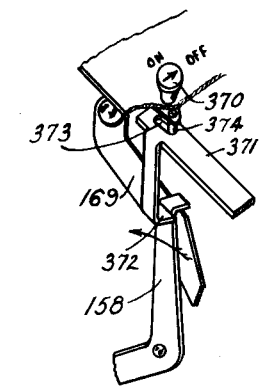
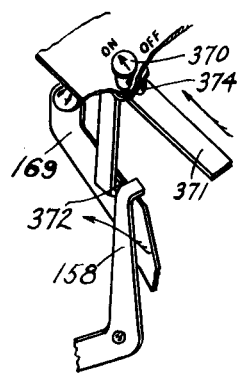
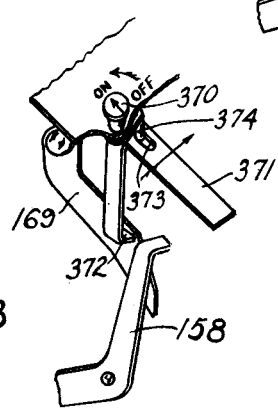
INVENTOR
Geo. C. Chase
E. W. Anderson
BY
ATTORNEY Aug. 12, 1930.  G. C. CHASE  1,773,025
CARRIAGE SHIFT CONTROL FOR CALCULATING MACHINES
Filed Oct. 3, 1927  7 Sheets-Sheet 5

INVENTOR
Geo. C. Chase.
E. W. Anderson
BY
ATTORNEY

Aug. 12, 1930.  G. C. CHASE  1,773,025
CARRIAGE SHIFT CONTROL FOR CALCULATING MACHINES
Filed Oct. 3, 1927  7 Sheets-Sheet 6

INVENTOR
Geo. C. Chase
E. W. Anderson
BY
ATTORNEY

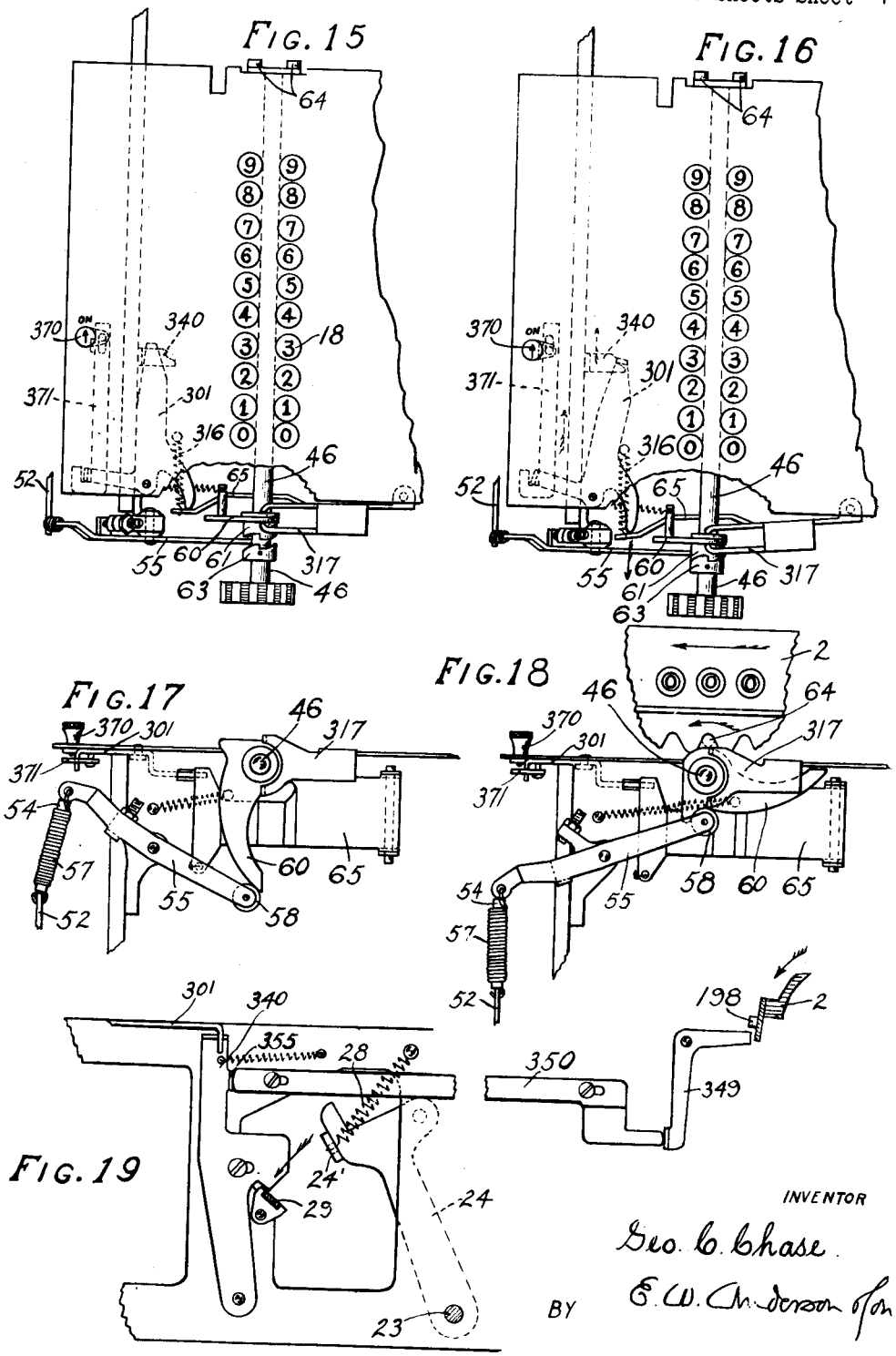

Patented Aug. 12, 1930

1,773,025

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

CARRIAGE-SHIFT CONTROL FOR CALCULATING MACHINES

Application filed October 3, 1927. Serial No. 223,708.

The invention has relation to means whereby the shifting of the numeral wheel carriage of a calculating machine may be accomplished at the desired time by power derived from an electric or other motor.

An object of the invention is to provide carriage shift mechanism which will be responsive to manipulation of a plus registration key. Another object of the invention is the provision of automatic carriage shifting means, and means for rendering the shift operative or inoperative.

The invention consists in the novel construction and combinations of parts as set forth in the appended claims.

In the accompanying drawings, illustrating the invention;

Fig. 2 is a sectional view, taken on the line 2—2 of Fig. 1;

Fig. 3 is a sectional view, taken on the line 3—3 of Fig. 4;

Fig. 4 is a sectional view, taken on the line 4—4 of Fig. 3;

Fig. 5 is a partial right side view of the machine, with casing broken away, showing the driving gears, auxiliary locating cam and operating key mechanism;

Fig. 6 is a perspective view showing the connections between the operating keys and clutch mechanism;

Fig. 11 is a detail perspective view, showing the parts effecting the engagement of the carriage shift clutch in neutral position;

Fig. 12 is a similar view to Fig. 11, with the parts in position shown in Fig. 10;

Fig. 13 is a similar view to Fig. 11, with the parts in position shown in Fig. 7;

Fig. 14 is a similar view to Fig. 11, with the parts in position shown in Fig. 8;

Fig. 15 is a plan view showing the carriage shift clutch mechanism in neutral position;

Fig. 16 is a similar view to Fig. 15, showing the carriage shift clutch engaged;

Fig. 17 is a front view of parts shown in Fig. 16, with the carriage shift cam in neutral position;

Fig. 18 is a similar view to Fig. 17, showing the cam rotated 90° and the carriage advanced a half step to the left;

Fig. 19 is a detail side view, showing the parts which effect the release of the carriage shift clutch latch.

Figure 1:
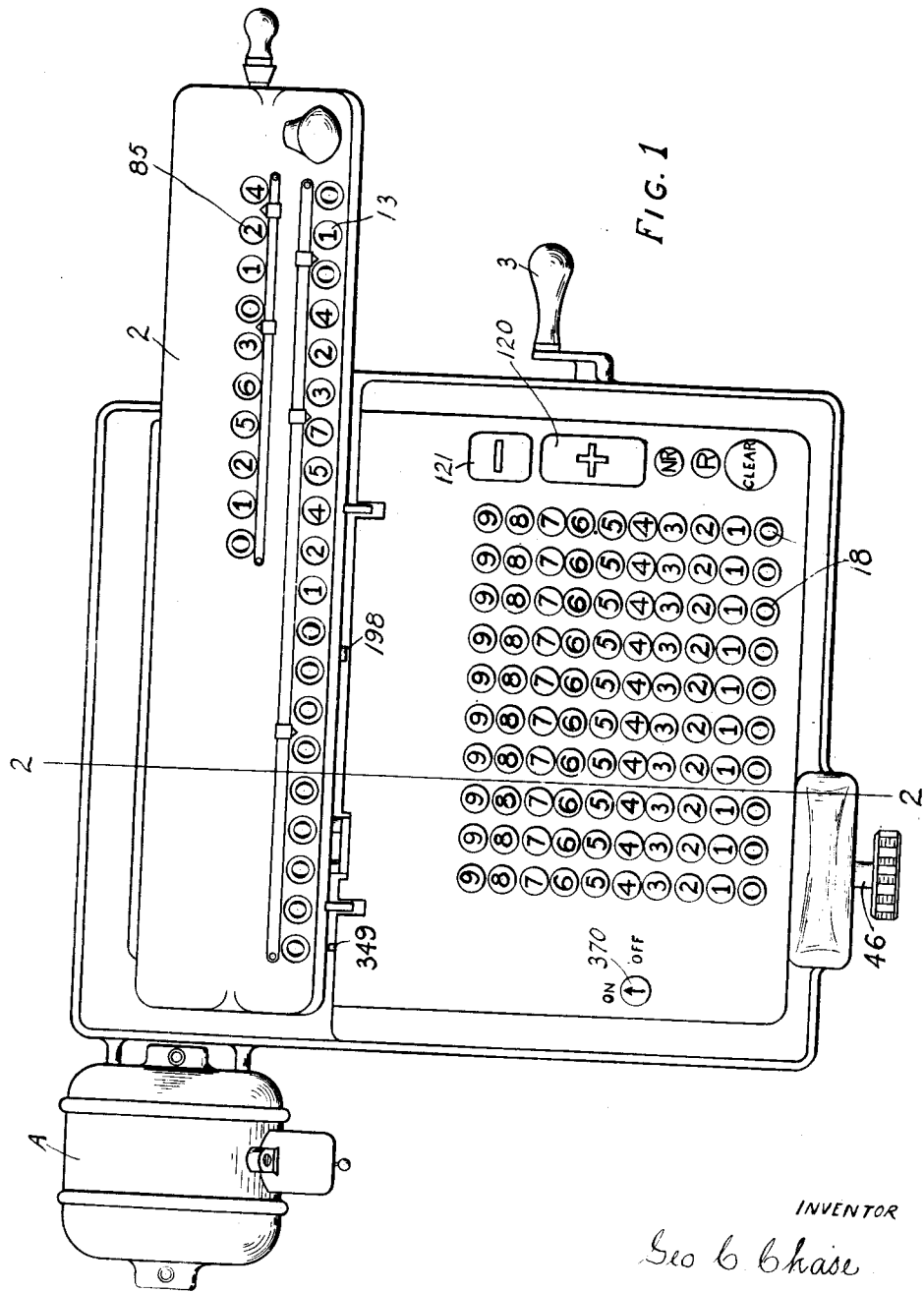
Fig. 1 is a plan view of a calculating machine, embodying the invention.
Figure 7:
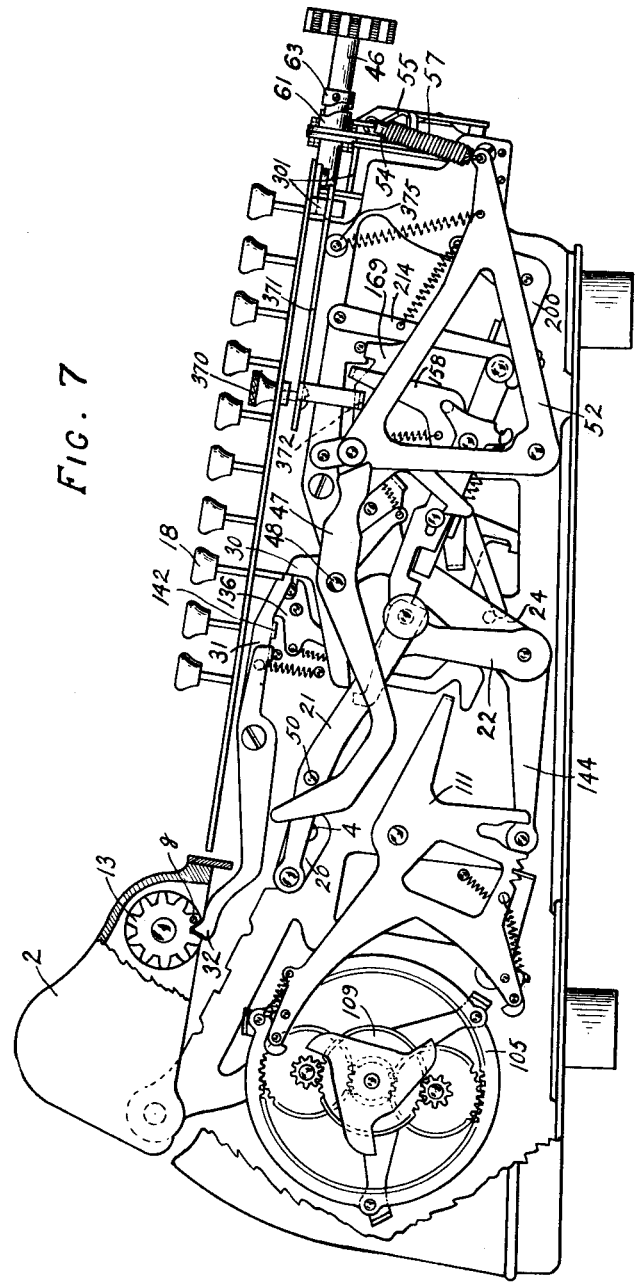
Fig. 7 is a left side view of the machine, with the casing broken away.

In these drawings the invention is shown as applied to a calculating machine constructed in accordance with the disclosure of Patent No. 1,566,650, issued to George C. Chase, Dec. 22, 1925, as modified by application S. No. 67,676, George C. Chase, inventor, filed Nov. 7, 1925, entitled Full cycle positioning mechanism, and application S. No. 79,811, George C. Chase inventor, filed Jan. 7, 1926, entitled Automatic control for calculating machines.

Registering means. Figs. 1-7

According to the present disclosure, and as more fully set forth in the patent above referred to, amounts set up on the keyboard 18 and thereby on the differential actuating gears 5 (Fig. 2) are registered upon numeral wheels 13 by the operation of the differential gear shaft 4 and of shaft 154 whereon the tens carry members are mounted, these shafts being connected by a train of one-to-one ratio gearing 74, 75, 80, 81 (Fig. 5). The hand crank 3, operating a gear 76, meshing with gear 75 of said train, is retained herein as an alternative means of operation, motor A being however the recognized means of operation.

Multiplier and quotient wheels 85 may be provided, as shown in the patent, or in accordance with other well known arrangements. The above mentioned patent also discloses the use of a transversely shiftable carriage 2, whereon the numeral wheels 13 and 85 are mounted, and which is employed in the well known manner in performing operations in multiplication and division.

The motor driving means illustrated is substantially the same as that disclosed in the Chase patent, motor A having driving connection with a planetary gear mechanism, the gear members 105 and 109 of which normally rotate idly but may be selectively arrested by means of the reversing clutch lever 111, to drive the third member of the differential, connected with carry shaft 154, forwardly or reversely, respectively.

Figure 8:
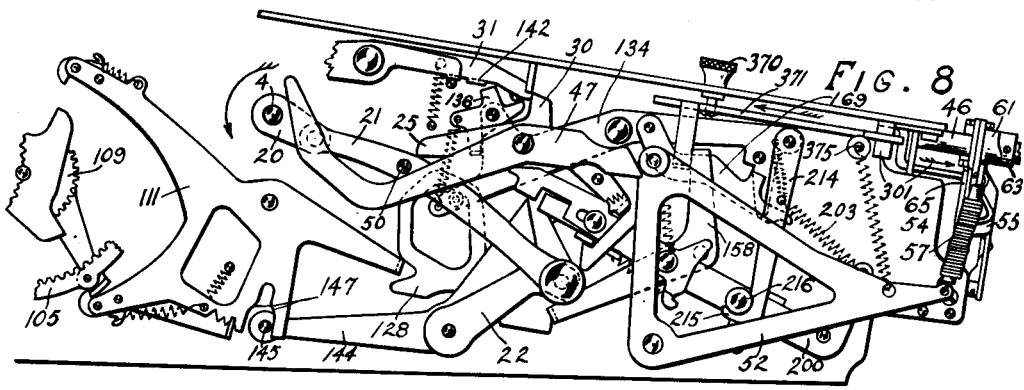
Fig. 8 is a detail left side view of the machine, showing parts in position assumed when the plus bar is depressed, the actuators in mid-cycle position, and the carriage shift mechanism in operative position.
Figure 9:
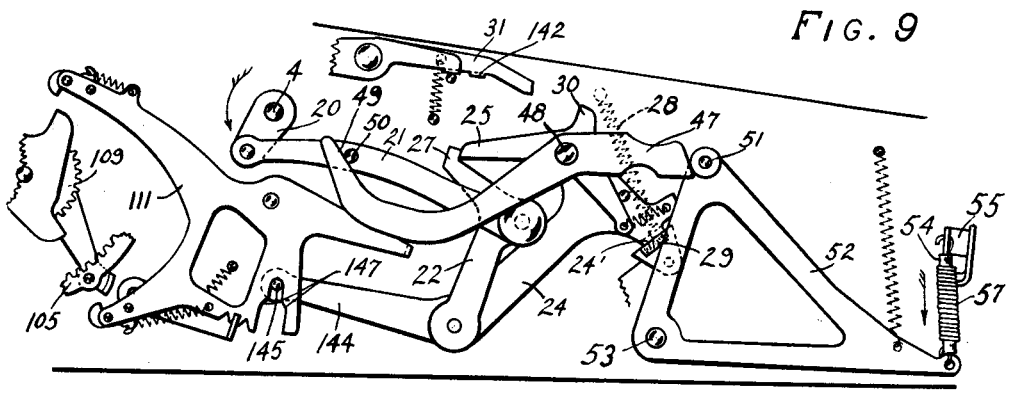
Fig. 9 is a detail left side view of the machine showing the carriage shift parts in position assumed at the end of an additive extra-cyclic movement.
Figure 10:
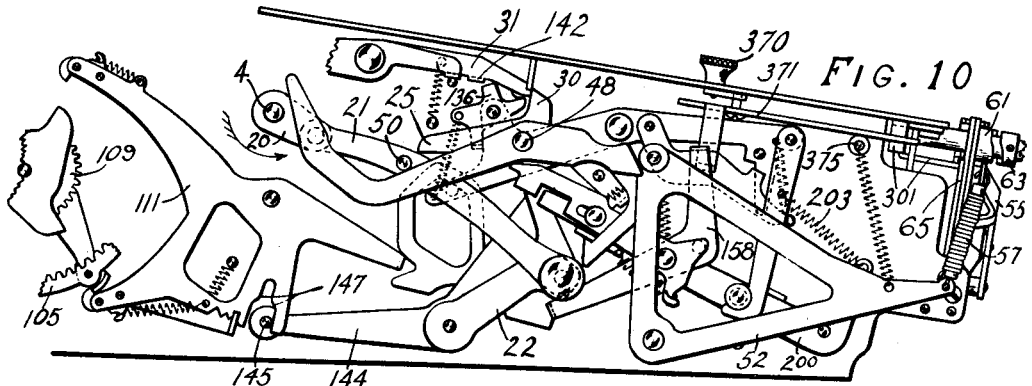
Fig. 10 is a similar view to Fig. 8, with the carriage shift mechanism in inoperative position.

Motor operation is controlled by means of an add key 120 and a substract key 121 (Figs. 1, 5 and 6), each having link engagement with an arm 124 of rock shaft 125, said shaft having at its opposite end an arm 126 connected with a setting lever 128 by means of coupling 127. Lever 128 is provided with a recess 129, between the walls of which lies a lug 130 of reversing clutch lever 111. Depression of the add or substract key will therefore rock lever 111 in the one or the other direction and effect additive or substractive operation of the machine. Before the clutch is engaged the movement of lever 128 will unlock the actuating mechanism of the machine in the following manner: Oppositely inclined cam faces 131 and 132 of setting lever 128 (Fig. 6) are adapted to depress an anti-friction roller 133, mounted upon the rearward arm of releasing lever 134. The forward arm of lever 134 is provided with a depending pivoted link 214 (Fig. 8) having an angularly disposed or hook end 215, lying beneath pin 216 of a lock lever 200, so that rocking movement of lever 134 will raise lever 200 out of locking engagement with the end of link 21 of rock arm 22, hereinafter described.

Movement of lever 128 upon depression of the add or the substract key will also set a member in position to trip the trigger 31 upon release of such key, so that at the end of a cycle suitable mechanism will be brought into action to bring the actuating mechanism to rest in full cycle position.

This member comprises releasing pawl 136, pivotally mounted upon releasing lever 134 and having an arm normally lying in front of the forward edge of lug 142 of trigger lever 31. When roller 133 of lever 134 is depressed, the arm of pawl 136 is disengaged from lug 142 and the pawl spring member will bring said arm to position beneath the lug. When the add or substract key is released by the operator, spring 203 (Fig. 8) tends to restore releasing lever 134 to normal position, the completion of the movement being insured by a spring pressed arm 169 of lever 134, tensioned by contact therewith of a lever 158, positioned by rock arm 22. As lever 134 is restored the arm of pawl 136 will contact with the lower face of lug 142 and lift trigger 31 from engagement with a lug 30 of stop element 25, pivotally mounted upon arm 24, the latter being rotated by its spring into position for engagement with shoulder 27 of rock arm 22. Arm 22 is connected to the shaft 4 of the differential actuating members 5, by link 21 and crank arm 20 of said shaft. Upon movement of crank arm 20 to dead center position, stop element 25 will drop into engagement with shoulder 27 and in the following rotation of the parts arm 24 will be carried forwardly with arm 22 until a suitable lug of the former arm is brought into contact with a stationary stop member 29. During this movement of arm 24 a pin 145 mounted upon a rearward extension 144 of said arm will engage one of the oppositely inclined cam faces 147 of reversing clutch lever 111 to move the latter to neutral position, whereby the actuating mechanism is released by the action of the motor. Arm 24 having contacted with stop 29, the rebound of the parts and the action of spring 28 will restore crank arm 20 to dead center position, restoring stop element 25 to restrained position and locking the actuating mechanism by means of lever 200, all as fully described in the above-noted patent and applications. A locator cam 153 and spring arm 155 (Fig. 5) assists in centralizing the actuating mechanism as it is brought to rest.

It will be evident from the above that addition and substraction are performed by a momentary depression of the corresponding key. Multiplication is performed by holding down add key 120 until a number of cycles of operation have been made corresponding to the value of the figure of the multiplier. In division, quotient figures may be automatically determined by the following method: The divisor set up on the keyboard 18 is subtracted from the dividend registered on the numeral wheels 13 once more than the number of times said divisor is contained in the corresponding portion of the dividend, a negative numeral wheel reading being obtained and the carry over mechanism of the machine providing for the registration of a series of nines upon numeral wheels 13 as far to the left as such carry over mechanism is provided. In other words, a transitional carry has occurred. This carry is utilized to stop the machine by means of a cam projection 32 of the rearwardly extending arm of trigger 31, said cam projection lying in the path of movement of the carry pin q of the numeral wheel 13 associated at the time with the highest order carry mechanism. Upon tripping of the stop member 25 the machine will be allowed to come to rest in spite of continued depression of the key, by the tripping of the coupling 127, as described in the Chase patent hereinbefore referred to. The operator will now release the substract key and depress add key 120, and upon the first additive registration a second transitional carry will move the left hand numeral wheels from 9 to 0 registration, correcting the excessive subtraction, leaving the proper quotient registered on one of the wheels 85 and again stopping the machine.

*Automatic carriage shift. Figs. 8–19*

In performing addition and subtraction the numeral wheel carriage will usually be retained in the same position, while in multiplication and division the shifting of the carriage is necessary, and in order to provide for an automatic shifting in the latter operation means are provided whereby shaft 46, having the opposite crank pins 64 engaging serrations of a rack located on the forward edge of the carriage, may be rotated by power derived from the motor A, transmitted through the operation of arm 24 of the full cycle stop mechanism following an additive registration.

Push rod 47 is pivoted on arm 24 at 48, and has the rear cam face 49 engaging pin 50 mounted upon link 21, the forward end of said push rod being adapted to push forwardly against roller 51 mounted on bell lever 52. Lever 52 is fulcrumed at 53 to the framing and its forward end is connected with an arm of carriage shifting lever 55 by means of spring 57 and spacer rod 54. The other arm of carriage shifting lever 55 is provided at its free end with a roller 58, adapted to operate against carriage shifting cam 60, loosely mounted on shaft 46 and having a toothed hub clutch member 61, adapted for engagement with the teeth of the complementary opposite clutch member 63, fast upon shaft 46.

When clutch members 61 and 63 are in engagement, therefore, movement of arm 24 during a stopping operation following release of the add key will bring pin 50 of link 21 into engagement with cam end 49 of the push rod and operate bell lever 52 to tension spring 57. Spring 57 in its elongation stores energy and utilizes the same more slowly in its operation of the carriage shifting lever 55. As roller 58 of the carriage shifting lever is carried upward, cam 60 is rotated about 90° counterclockwise, as viewed in Figure 18, thereby raising the carriage and advancing it about one half of its step movement to the left. The momentum of the carriage and the force of gravity acting thereon is sufficient to complete its one step of movement.

In order that the operator may control the shifting of the numeral wheel carriage, so that said carriage may shift or remain undisturbed, according to the operation being performed, the following means are provided for controlling and operating the clutch 61, 63.

The lever 158 hereinbefore referred to is actuated during each rotation of the machine, and a bar 371 is located beneath the keyboard plate and provided at its rear end with an extension having a lug 372 adapted to be brought into the path of movement of lever 158. The rearward end of bar 371 is also provided with a slot 373 engaged by a crank pin 374 of the adjusting knob 370, the bar being supported upon an enlarged head of the crank pin and upon a pin 375 (Fig. 7) of the framing. When knob 370 is turned to the position illustrated in Figure 12, bar 371 will pivot upon its forward connection, to be described, and will be so adjusted that upon operation of the machine lever 158 will pass inside lug 372 without engagement. When however, knob 370 is turned to the position shown in Figure 14, lever 158 will contact with lug 372 and bar 371 will be moved rearwardly. The forward end of bar 371 is provided with a slot engaging an arm of clutch shift lever 301 (Figs. 15, 16, 7, 8, 10), so that as the bar is moved rearwardly lever 301 is rocked, and a forwardly extending arm thereof pushes against pivoted plate 65, having a shipper arm 317 engaging clutch hub 61, the movement described serving to engage said clutch hub with the clutch member 63. Clutch shift lever 301 is provided with a latch arm, adapted to engage latch 340 when the lever is moved to clutch engaging position.

It will thus be seen that the position of adjusting knob 370 will determined whether, upon operation of the machine, the carriage shifting clutch will be engaged or left disengaged, and whether the carriage will be shifted or left unshifted at the end of the operation.

At the end of the operation, the full-cycle stopping means will be operated, whereupon the carriage shift impulse will be imparted, as previously described, and arm 24 will contact with and release latch 340, so that upon a succeeding operation of the machine the carriage will shift or remain idle, according to the setting of knob 370.

When the numeral wheel carriage 2 has been shifted to its extreme left hand position, the following means will prevent the occurrence of a further carriage shifting impulse: A pin 198 on the forward edge of the carriage is adapted when the carriage descends into its extreme position to contact with and rock a bell lever 349 fulcrumed in the framing of the machine. Slide 350 lies between bell lever 349 and latch 340 and as bell lever 349 is rocked serves to move said latch out of engagement with the clutch shifting lever 301, whereupon spring 316 attached to the plate 65 will shift the clutch out of engagement. Since lever 158 and arm 24 of the full cycle stopping mechanism are actuated at different times, and since latch 340 can not be engaged while the carriage lies in extreme left hand position, the movement of lever 158 will now be idle, and no shifting impulse will occur, even though the adjusting knob 370 is set to shifting position.

*Operation*

Addition and subtraction are performed as hereinbefore described with adjusting knob 370 set to "off" or non-shifting position.

In multiplication the carriage should be set over to the right a number of places at least equal to the number of places contained in the multiplier. Knob 370 is placed in "on" or carriage shifting position, and the multiplication is started with the highest order figure of the multiplier, by holding down add key 120 for the correct number of cycles. Upon release of the add key the machine will stop and the carriage will be shifted one step toward the left. The operation is repeated until the complete product is registered.

In division the carriage may be set as desired, preferably as far to the right as possible. With knob 370 in "off" position the dividend is transferred from the keyboard 18 to the numeral wheels 13 by depression of add key 120. The wheels 85 are now cleared, the divisor is set up on the keyboard and knob 370 is set to "on" position. Subtract key 121 is held depressed until the machine stops, whereupon the plus bar is depressed. Upon the completion of one additive revolution the machine will stop and the carriage will be shifted one step toward the left. The alternate depression of the add and subtract keys is repeated until the desired quotient has been obtained.

I claim:—

1. In a calculating machine having a transversely shiftable carriage, numeral wheels thereon, actuating mechanism for said numeral wheels, and motor drive means for said actuating mechanism, a motor drive control mechanism including a key adapted upon depression to initiate and continue a registering operation indefinitely, and means responsive to manual release of said key to bring the actuating mechanism to rest and to shift the numeral wheel carriage.

2. In a calculating machine having a transversely shiftable carriage, numeral wheels thereon, actuating mechanism for said numeral wheels, motor drive means for said actuating mechanism, and motor drive control mechanism including a registration determining key, carriage shifting means including mechanism responding to manipulation of said key to shift the carriage by power derived from the motor, and a member settable to adjust the key responsive shifting mechanism to operative or non-operative position.

3. In a calculating machine having a transversely shiftable carriage, numeral wheels thereon, actuating mechanism for said numeral wheels, and motor drive means for said actuating mechanism, carriage shifting means including a train of shifting elements deriving power from the motor, a clutch in said train, and a train of clutch engaging elements deriving power from said motor and including an element manually adjustable to determine the engagement.

4. In a calculating machine having a transversely shiftable carriage, numeral wheels thereon, actuating mechanism for said numeral wheels, and motor drive means for said actuating mechanism, carriage shifting means including a train of mechanism deriving power from the motor, a clutch in said train, a latch controlling engagement of said clutch, means energized by said motor for engaging the clutch and latching it in engaged position, and means for holding said clutch unlatched when the carriage lies in extreme shifted position.

5. In a calculating machine having a transversely shiftable carriage, numeral wheels thereon, actuating mechanism for said numeral wheels, motor drive means for said actuating mechanism, and motor drive mechanism including a registration determining key, carriage shifting means including mechanism responding to manipulation of said key to shift the carriage by power derived from the motor, a member settable to adjust the key responsive shifting mechanism to operative or non-operative position, and means adapted for effective adjustment when the carriage lies in extreme shifted position to prevent transmission of a shifting impulse to said carriage.

6. In a calculating machine having a transversely shiftable carriage, numeral wheels thereon, and means for registering values upon said wheels including a motor and a freely retractable motor key manually operable to initiate the registration and to continue the same indefinitely; means including stopping elements and carriage shifting elements operable in response to movement of a numeral wheel to terminate a registration and thereafter to shift the carriage with said key held in operative position.

7. In a calculating machine having a transversely shiftable carriage, numeral wheels thereon, and actuating mechanism for said numeral wheels; a carriage shifting train including a clutch, settable means for determining the engagement of said clutch, means for engaging the clutch upon operation of the actuating mechanism, and means for determining the transmission of a carriage shifting impulse through said clutch.

8. In a calculating machine having a transversely shiftable carriage, numeral wheels thereon, and actuating mechanism for said numeral wheels; a carriage shifting train including a clutch, settable means for determining the engagement of said clutch, means for engaging the clutch upon operation of the actuating mechanism, means for determining the transmission of a carriage shifting impulse through said clutch, and means for automatically disengaging the clutch upon the transmission of such impulse.

In testimony whereof I affix my signature.

GEORGE C. CHASE.